United States Patent
Lynch et al.

(10) Patent No.: US 7,650,917 B2
(45) Date of Patent: Jan. 26, 2010

(54) ARCHED TOP DOOR FACING AND SYSTEM FOR FORMING AN ARCHED DOOR FACING

(75) Inventors: Steven K. Lynch, St. Charles, IL (US); Mark A. Ruggie, Franklin Park, IL (US); Jason Caulk, St. Charles, IL (US)

(73) Assignee: Masonite Corporation, Tampa, FL (US)

( * ) Notice: Subject to any disclaimer, the term of this patent is extended or adjusted under 35 U.S.C. 154(b) by 809 days.

(21) Appl. No.: 11/204,153

(22) Filed: Aug. 16, 2005

(65) Prior Publication Data

US 2007/0051429 A1     Mar. 8, 2007

(51) Int. Cl.
*B27C 5/00* (2006.01)
(52) U.S. Cl. .................... 144/137; 144/134.1; 144/3.1; 144/359; 144/363
(58) Field of Classification Search ............. 144/134.1, 144/135.2, 135.3, 135.4, 136.1, 136.95, 286.1, 144/286.5; 409/138, 199, 179, 182, 180, 409/111, 112; 156/78, 242, 245, 230, 235, 156/240, 247, 292, 293; 52/782.1, 783.1, 52/787.1, 736.13; 83/733, 468.8, 468.13; 33/27.03, 26
See application file for complete search history.

(56) References Cited

U.S. PATENT DOCUMENTS

| | | | |
|---|---|---|---|
| 2,548,302 A * | 4/1951 | Gilson ............................ 33/26 |
| 3,878,647 A | 4/1975 | Burgers |
| 4,152,876 A | 5/1979 | Seely |
| 4,524,812 A * | 6/1985 | Murphy .................... 144/135.2 |
| 4,685,496 A | 8/1987 | Livick |
| 5,038,841 A * | 8/1991 | Larmon ........................ 144/371 |
| RE34,125 E * | 11/1992 | Amos et al. .................... 409/80 |
| 5,161,592 A | 11/1992 | Rasmussen |
| 5,285,608 A | 2/1994 | Costello |
| 5,432,990 A * | 7/1995 | Seneff ........................... 29/251 |
| 5,486,076 A * | 1/1996 | Hauschopp .................. 409/179 |
| 5,494,384 A * | 2/1996 | Gianfranco ................. 409/182 |
| 5,771,656 A | 6/1998 | Amoretti |
| 5,778,949 A * | 7/1998 | Draves ....................... 144/48.6 |
| 6,378,580 B1 * | 4/2002 | Lovett ......................... 144/371 |
| 6,488,061 B2 * | 12/2002 | White ......................... 144/3.1 |
| 6,523,269 B1 * | 2/2003 | Vincent ..................... 33/27.01 |
| 6,568,308 B2 * | 5/2003 | Ricker ....................... 83/477.2 |
| 6,610,164 B2 * | 8/2003 | Luetgert et al. ............. 156/230 |

(Continued)

OTHER PUBLICATIONS

Custom Glass Doors.com catalog, 2001-2002.*

*Primary Examiner*—Dana Ross
*Assistant Examiner*—Jennifer Chiang
(74) *Attorney, Agent, or Firm*—Berenato & White, LLC

(57) ABSTRACT

The present invention is directed to a system and method for forming an arched top door facing, and the resulting facing. The system includes a panel, a table and a cutting assembly. The panel has a first surface intended to be interiorly disposed and a second surface intended to be exteriorly disposed. At least one boss extends from the first surface. The table has a planar surface and a locator extending outwardly from the planar surface. The locator cooperates with the boss to locate the panel on the planar surface. The cutter assembly is operatively associated with the table, and includes a blade spaced from the locator. The blade engages the panel and forms a curved edge in the panel when one of the blade and the panel is rotated about the locator.

18 Claims, 7 Drawing Sheets

U.S. PATENT DOCUMENTS

| | | |
|---|---|---|
| 6,615,558 B2 | 9/2003 | Libby |
| 6,631,603 B2 * | 10/2003 | Zornes .................... 52/782.1 |
| 6,651,541 B2 * | 11/2003 | Faircloth .................... 83/733 |
| 6,752,572 B2 * | 6/2004 | Talesky et al. .............. 409/179 |
| 6,862,863 B2 * | 3/2005 | McCorkle et al. .......... 52/787.1 |
| 6,962,180 B2 * | 11/2005 | White ........................ 144/360 |
| 2002/0144749 A1 | 10/2002 | White |
| 2003/0200714 A1 * | 10/2003 | Minke et al. .................. 52/423 |
| 2004/0007797 A1 * | 1/2004 | Minke et al. ................. 264/333 |
| 2004/0078303 A1 | 4/2004 | Patridge |
| 2004/0080090 A1 | 4/2004 | White |
| 2005/0005999 A1 | 1/2005 | White |

* cited by examiner

ARCHED TOP DOOR FACING AND SYSTEM FOR FORMING AN ARCHED DOOR FACING

FIELD OF THE INVENTION

The present invention is directed to a system and method for forming an arched top door facing, and the resulting facing. The system includes a panel, a table and a cutting assembly. The panel has a first surface intended to be interiorly disposed and a second surface intended to be exteriorly disposed. At least one boss extends from the first surface and defines a bore. The table has a planar surface and a locator pin extending outwardly from the planar surface. The locator pin is receivable in the bore. The cutter assembly is operatively associated with the table, and includes a blade spaced a predetermined distance from the locator pin. The blade engages the panel and forms a curved edge in the panel when one of the cutter assembly and the panel is rotated about the locator pin.

BACKGROUND OF THE INVENTION

It is sometimes desirable to provide a door having a curved upper edge or 'arched top'. The production of arched top, solid wood doors traditionally involved a series of cuts made by successive separate cutting operations in order to achieve the completed arch design. Such cutting operations are relatively time consuming and labor intensive. As such, manufacturing costs are relatively high.

Solid wood doors are relatively expensive compared to hollow core doors. As known in the art, a hollow core door includes first and second door facings secured to opposite sides of a frame. The door may also include a core. It would be desirable to provide a hollow core door having an arched top.

Various systems for cutting circular or elliptical arcs in a wood block have been developed. However, such conventional systems are designed for forming arches in relatively small components such as curved trim molding. As such, they fail to provide an efficient and consistent system for cutting relatively large components such as door facings. The edges of door facings are often irregular and must be trimmed to size. As such, it would be difficult or cost prohibitive to use conventional cutting systems for forming arches in door facings.

Therefore, there is a need for a system for forming an arched top door facing that solves some or all of the above-noted problems.

SUMMARY OF THE INVENTION

The present invention is directed to a system for forming an arched top door facing. A system according to one embodiment of the invention includes a panel, a table and a cutting assembly. The panel has a first surface intended to be interiorly disposed and a second surface intended to be exteriorly disposed. At least one boss extends from the first surface. The table has a planar surface and a locator extending outwardly from the planar surface. The locator cooperates with the boss for locating the panel on the planar surface. The cutter assembly is operatively associated with the table, and includes a blade spaced a predetermined distance from the locator. The blade extends through and perpendicular to a plane coplanar with the plane of the panel when the panel is located on the planar surface. The blade engages the panel and forms a curved edge in the panel when one of the blade and the panel is rotated about the locator.

The present invention also relates to the resulting arched top door facing. The facing includes first and second major surfaces, with the first major surface intended to be interiorly disposed and the second major surface intended to be exteriorly disposed. The facing is defined by a first side edge, a second side edge substantially parallel to the first side edge, a bottom edge, and an arcuate top edge. At least one boss extends from and is disposed on the first major surface. The boss has a donut-shaped body portion defining a bore.

An arched top door is also disclosed. The door includes a perimeter frame having first and second stiles, a bottom rail, and an arcuate top rail. First and second door facings are secured to opposite sides of the frame. Each facing is defined by first and second side edges, a bottom edge, and an arcuate top edge aligned with and secured to the first and second stiles, bottom rail and arcuate top rail, respectively. Each facing has at least one donut-shaped boss extending from and disposed on an interiorly disposed surface.

The present invention also relates to a method of forming an arched top door facing. A panel is provided having opposite first and second major surfaces, and at least one boss extending from the first major surface. The boss has a body portion defining a bore. A table is provided having a planar surface and a locator pin extending outwardly from the planar surface. A cutter assembly is provided, which is operatively associated with the table. The cutter assembly has a blade spaced by a first distance from the locator pin. The pin is aligned with the bore and inserted therein so that the first major surface is disposed on the table planar surface. One of the panel and the blade is rotated about the locator pin so that the blade engages the panel and forms an arcuate edge in the panel.

The disclosed system efficiently removes the material from the top portion of a panel, such as a shear wall molded SMC door facing. Utilizing a single conventional rectangular shear core/cavity die set, a molded-in boss element may be integrally molded into a panel. The boss element is preferably 'donut' shaped and is configured to receive a locator pin on the cutting table. The cutting table supports the panel and the boss element receives the locator pin. Once positioned and aligned on the table, a cutting blade is rotated through an arcuate path so that the blade contacts the panel and thereby removes a desired portion of material at an end of the panel.

DETAILED DESCRIPTION OF THE INVENTION

Figure 1:
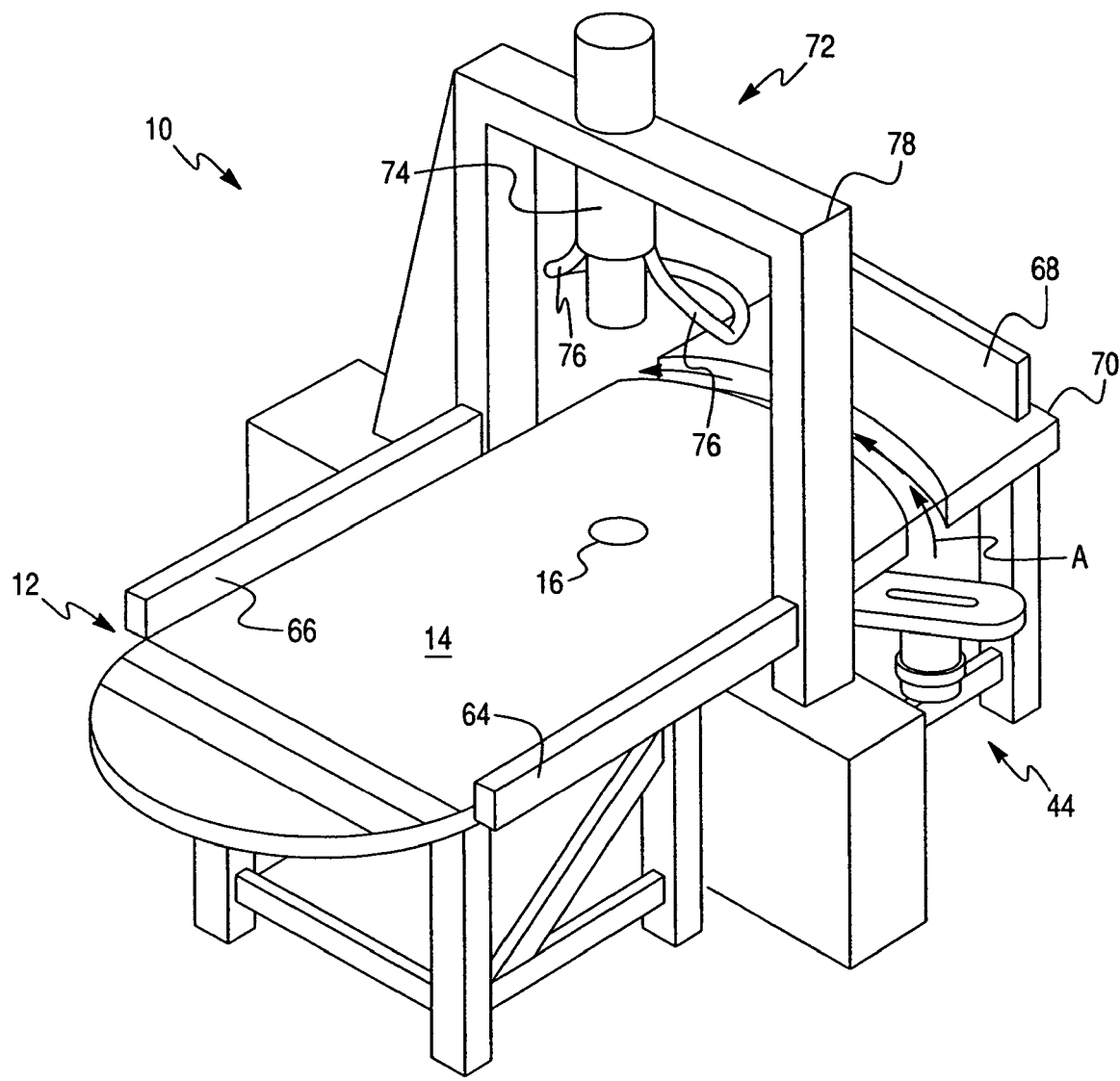
FIG. 1 is a perspective view of an apparatus for forming an arched top panel according to an embodiment of the present invention.

An apparatus 10 for forming an arched-top panel according to an embodiment of the present invention is best shown in FIG. 1. Apparatus 10 includes a table 12 having a receiving surface 14 and a locator pin 16 extending outwardly from receiving surface 14. Receiving surface 14 is preferably planar and sized to receive a substantially rectangular panel, such as a door facing 18, as best shown in FIG. 2.

Figure 2:
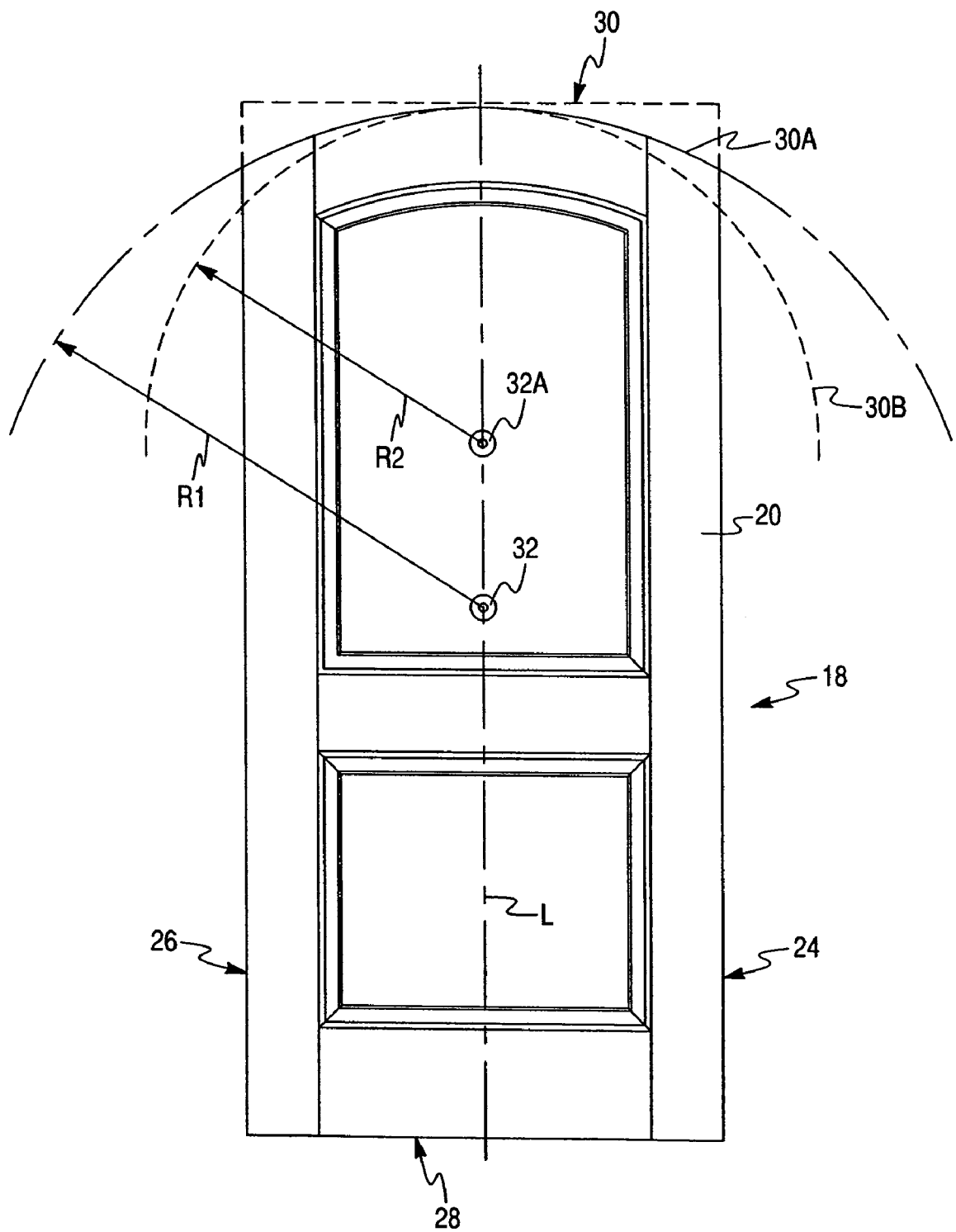
FIG. 2 is a plan view of an arched top panel according to the present invention, with edges of removed portions, and a center line and cut lines shown in phantom.
Figure 3:
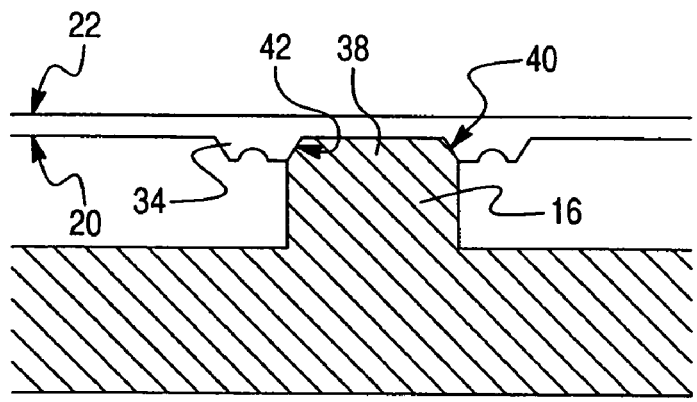
FIG. 3 is a fragmentary sectional view of a locator pin and panel according to the present invention.
Figure 4:
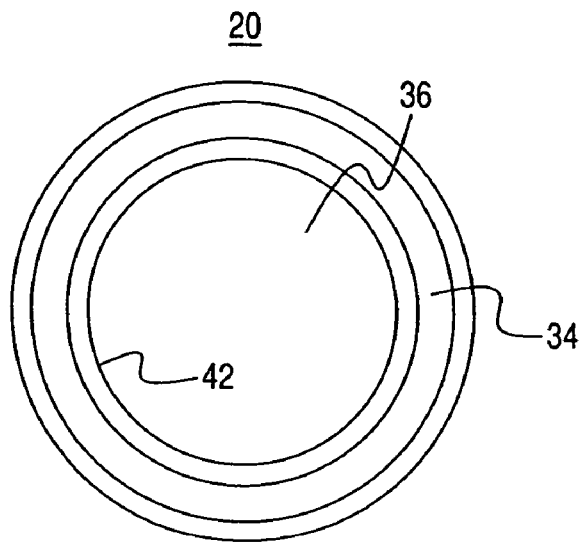
FIG. 4 is a plan view of a boss according to an embodiment of the present invention.
Figure 5:
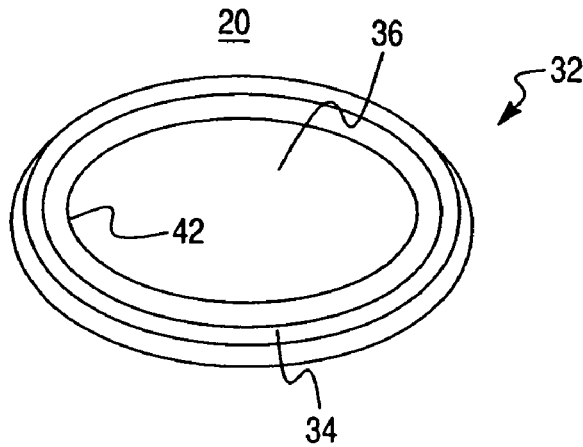
FIG. 5 is a perspective view of the boss shown in FIG. 4.

Door facing 18 includes a first major surface 20 intended to be interiorly disposed and an opposite second major surface 22 intended to be exteriorly disposed, as best shown in FIGS. 2 and 3. Door facing 18 preferably initially has a substantially rectangular configuration, with first and second side edges 24, 26, a bottom edge 28, and a top edge 30 (shown in phantom). A boss 32 is disposed on first major surface 20 and extends outwardly therefrom. As best shown in FIGS. 4 and 5, boss 32 preferably has a donut-shaped body portion 34 that defines a central bore 36. Bore 36 preferably extends substantially perpendicular to major surface 20. Boss 32 may be equidistant from first and second side edges 24, 26 so that bore 36 is disposed along a center line L (shown in phantom) of door facing 18, as best shown in FIG. 2. Door facing 18 may include more than one boss 32, with each boss 32 disposed along center line L and spaced from each other.

Preferably, door facing 18 is formed from a sheet molding compound ("SMC"), thermosetting polymer material, or some other flowable material. While we prefer the use of SMC to produce door facing 18, other door facing materials, such as wood composite, may be used in practice of the invention. Boss 32 may be integrally formed on door facing 18 during its formation, such as during the molding process. For example, a die set configured for forming boss 32 may be provided, or a local insert may be positioned within the die set for forming boss 32. As best shown in the cross-sectional views of FIGS. 3 and 6, the integrally molded boss 32 and the molded panel body of the door facing 18 constitute a monolithic structure. Alternatively, boss 32 may be separately formed and thereafter secured to first major surface 20 of a molded panel. For example, one or more body portions 34 may be adhesively secured to first major surface 20 to form door facing 18. While we prefer that boss 32 extend from door facing 18 and locator pin 16 extend from receiving surface 14, those skilled in the art would recognize that a boss could extend from receiving surface 14 and a pin-like structure extend from the door facing.

Figure 6:
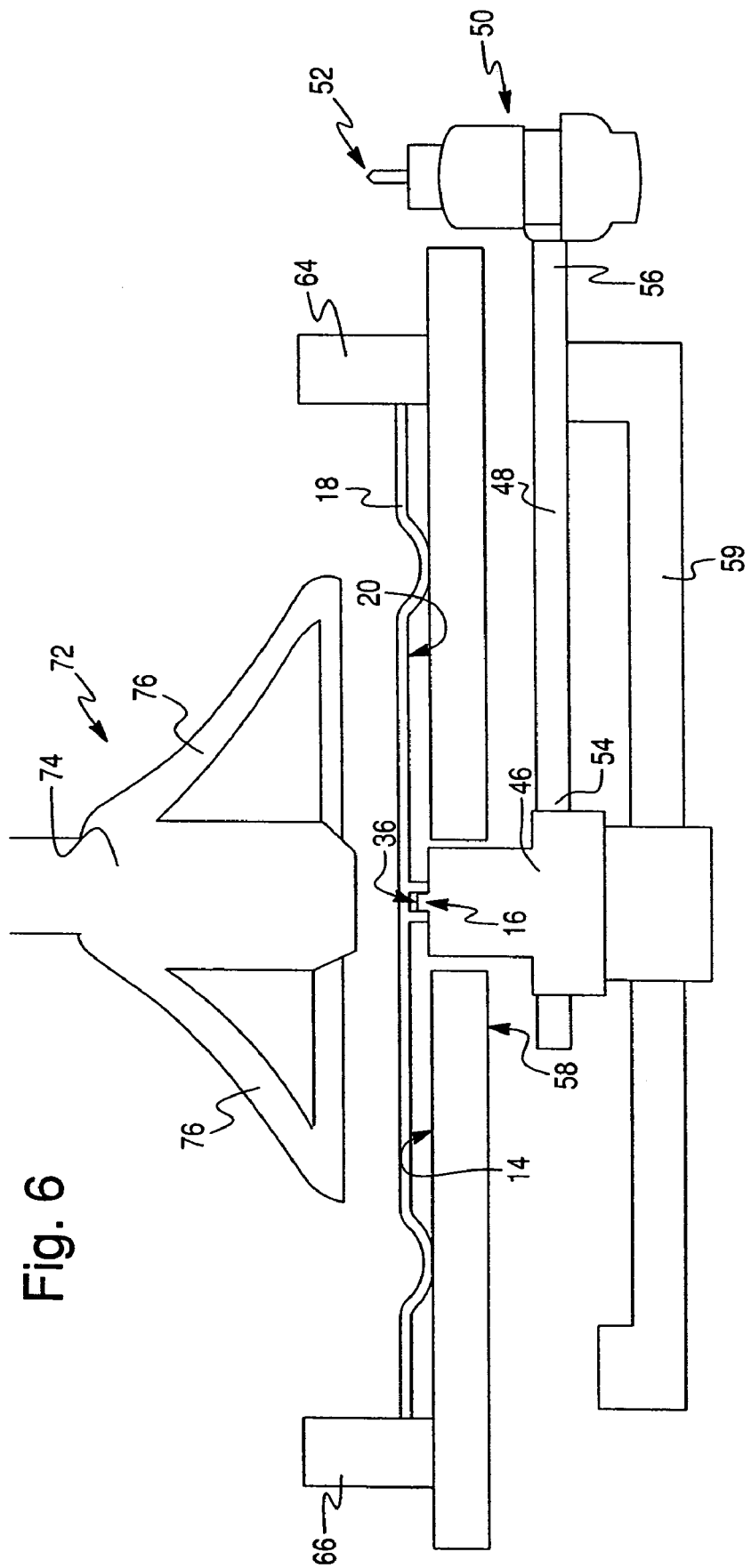
FIG. 6 is a fragmentary cross-sectional view of the apparatus of the present invention showing the cutting apparatus, table, and a door facing disposed on the table.

As best shown in FIGS. 3 and 6, locator pin 16 is received within bore 36 when first major surface 20 of door facing 18 is placed on receiving surface 14. Locator pin 16 preferably has a cylindrical configuration with an outer tip 38 complimentarily configured to be received within bore 36. Outer tip 38 may include angled sides 40 that correspond to angled sidewalls 42 of bore 36, as best shown in FIG. 5. In this way, outer tip 38 tends to slide into place in bore 36 even if door facing 18 is slightly misaligned with locator pin 16 when door facing 18 is initially disposed on receiving surface 14.

Figure 7:
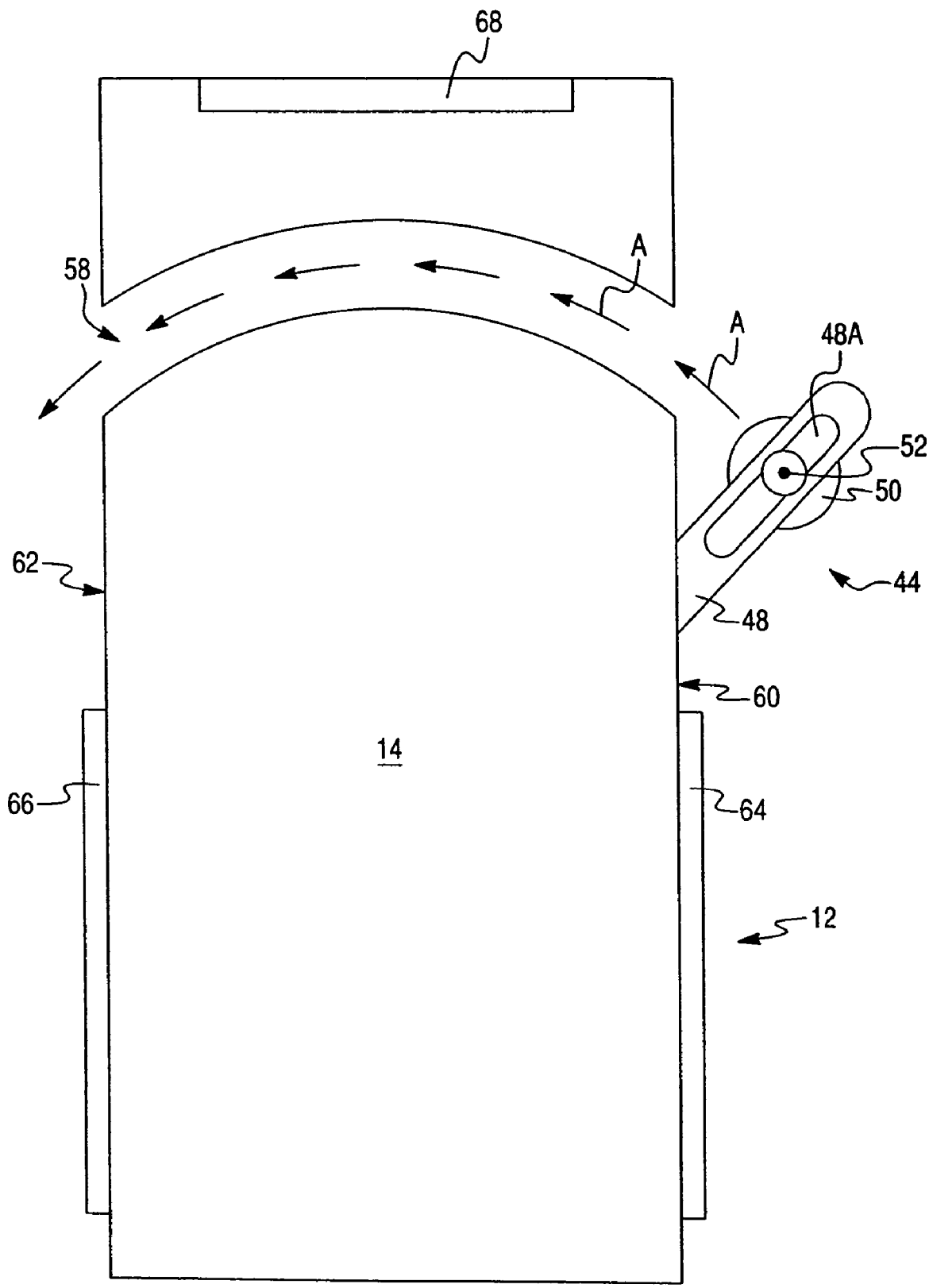
FIG. 7 is a plan view of the table and cutting device of the present invention.

Referring to FIGS. 1 and 6-7, apparatus 10 includes a cutter assembly 44 operatively associated with table 12. Cutter assembly 44 includes a rotatable arm support 46, a router arm 48, and a cutting device 50 having a cutting blade 52, such as a high speed router. Router arm 48 preferably includes a first end 54 connected to arm support 46 and a second end 56 connected to cutting device 50. Arm support 46 is preferably axially aligned with locator pin 16, and may be disposed proximate an underside 58 of table 12. Router arm 48 preferably extends outwardly from arm support 46 on a plane substantially parallel with the plane of receiving surface 14. Cutting blade 52 is disposed on cutting device 50 and rotatable about locator pin 16 via rotatable arm support 46 so that cutting blade 52 extends through an arcuate path (shown by arrows A) extending through the plane on which receiving surface 14 lies. In this way, cutting blade 52 engages door facing 18 when door facing 18 is disposed on receiving surface 14.

Cutter assembly 44 may also include a secondary support bar 59 attached to arm support 46, which rotates with and supports router arm 48. Cutting blade 52 may encounter resistance as it cuts through door facing 18, which may generate an upward or downward force on cutting device 50 and therefore router arm 48. Secondary support bar 59 ensures that router arm 48 is maintained on the plane substantially parallel with the plane of receiving surface 14, even if such resistance is encountered.

Router arm 48 and cutting device 50 are rotatable about locator pin 16 via rotatable support arm 46. Preferably, router arm 48 and cutting device 50 may be rotated about locator pin 16 so that cutting blade 52 travels along an arcuate path of at least about 90° relative to locator pin 16. Router arm 48 may have an adjustable length so that cutting blade 52 may be disposed at a selected, predetermined distance from locator pin 16. Router arm 48 may also include a slot 48A proximate second end 56, with cutting device 50 slidably received therein so that the distance between cutting blade 52 and locator pin 16 may be adjusted.

Receiving surface 14 may include an arcuate slot 58 extending between first and second sides 60, 62 and corresponding to arcuate path A through which cutting blade 52 passes. Alternatively, cutting blade 52 may simple pass through a path adjacent an end of table 12. Table 12 may include side walls 64, 66 extending upwardly from sides 60, 62 of receiving surface 14, respectively. Table 12 may also include an end wall 68 extending upwardly from an end 70 of receiving surface 14 and spaced from arcuate slot 58.

In order to form an arched top edge 30A in door facing 18, as best shown in FIG. 2, first major surface 20 is disposed on receiving surface 14, as best shown in FIG. 6. Locator pin 16 is aligned with and inserted into bore 36 of boss 32, thereby ensuring that door facing 18 is in a predetermined position on receiving surface 14 and that arched top edge 30A will be formed at a predetermined distance from bore 36. First and second side edges 24, 26 may be aligned with side walls 64, 66, respectively. Side walls 64, 64 may be slidingly disposed on receiving surface 14, so that side walls 64, 66 may be moved against door facing 18 to ensure that door facing 18 is properly aligned and secured in the desired position prior to cutting arched top edge 30A. End wall 68 may also be slidingly disposed on receiving surface 14 so that end wall 68 may be slid against and abut top edge 30. Alternatively, side walls 64, 66 and end wall 68 may be fixed on table 12.

Referring again to FIGS. 1 and 6, apparatus 10 may include a holding device 72 operatively associated with table 12. Holding device 72 may include a central body 74 and holding arms 76 extending therefrom. Holding device 72 is preferably disposed above receiving surface 14 via a holding support 78. Central body 74 is movable toward and away from receiving surface 14, such as by an operatively associated pneumatic cylinder. When door facing 18 is disposed on receiving surface 14, central body 74 may be moved toward receiving surface 14 until holding arms 76 engage door facing 18. Holding arms 76 apply a sufficient amount of downward force against door facing 18 to secure door facing 18 in place on receiving surface 14 during the cutting operation. Preferably, central body 74 is axially aligned with locator pin 16. However, holding device 72 may also be disposed above table 12 at some other position relative to receiving surface 14. It should be understood that other devices may be used to secure door facing 18 against receiving surface 14. For example, one or more clamps may be used about the periphery of door facing 18 and receiving surface 14. Alternatively, side walls 64, 66 may slide inwardly against door facing 18 and abut door facing 18 with a sufficient amount of force to hold door facing 18 in place during the cutting operation. However, the inwardly directed force of side walls 64, 66 against door facing 18 should not be so great as to cause door facing 18 to bow or flex. Regardless of how door facing 18 is held in place, proper alignment is ensured when locator pin 16 is inserted in bore 36 of boss 32.

As door facing 18 is being aligned and secured on receiving surface 14, cutting device 50 is disposed in an initial position so that cutting blade 52 is spaced from arcuate slot 58, as best shown in FIGS. 1 and 7. Cutting device 50 is then rotated about locator pin 16 so that cutting blade 52 passes through arcuate slot 58, thereby engaging and cutting door facing 18 to form arched top edge 30A.

The severity of the curvature of the arcuate edge formed on door facing 18 may be selected by adjusting the distance between cutting blade 52 and locator pin 16, thereby adjusting the radius of arcuate path A. As noted above, this distance may be adjusted by increasing or decreasing the length of router arm 48, by changing the position of cutting device 50 in slot 48A, or a combination thereof. Arched top edge 30A may be formed when boss 32 is aligned with locator pin 16. The distance between cutting blade 52 and locator pin 16 is adjusted so that arcuate path has radius R1. The severity of the curvature of the arcuate edge may be increased by decreasing the distance between cutting blade 52 and locator pin 16, thereby decreasing the radius of arcuate path A.

In addition, the position in which the arcuate edge is formed on door facing 18 relative to end 30 may be selected by selecting one of a plurality of bosses disposed on first major surface 20. For example, door facing 18 may include a second boss 32A spaced from boss 32 and positioned along center line L, as best shown in FIG. 2. Arched top 30B (shown in phantom) may be formed when boss 32A is aligned with locator pin 16, and the length of router arm 48 is adjusted so that the resulting arcuate path has radius R2, which is less than radius R1. While the length of router arm 48 may be shortened, cutter blade 52 should be able to pass through arcuate slot 58 when rotated about locator pin 16.

Any number of bosses 32 may be provided on door facing 18 at various positions along center line L. One of the plurality of bosses 32 is selected with which to align locator pin 16, and locator pin 16 is then aligned and inserted into the bore from the selected boss 32. Router arm 48 may then be adjusted to a desired length so that blade 52 will engage and cut door facing 18 starting at a desired location along one of side edges 24, 26 (and so that blade 52 passes through arcuate slot 58). In this way, a conventional rectangular door facing 18 may be cut to have an arched top edge having a selected curvature (such as edge 30A or edge 30B). In addition, a desired length of door facing 18 may be maintained even if the radius of arcuate path A is decreased by aligning locator pin 16 with a boss (such as boss 32A) that is close enough to end 30 to ensure that the desired length of the resulting panel (measured along ling L) is maintained. Thus, arched top edge 30B has a severity of curvature greater than arched top edge 30A. However, a resulting arched top door facing having arched top edge 30B may have the same length (measured along line L) as an arched top door facing having arched top edge 30A by selecting boss 32A when forming arched top edge 30B and boss 32 when forming arched top edge 30A.

Figure 8:
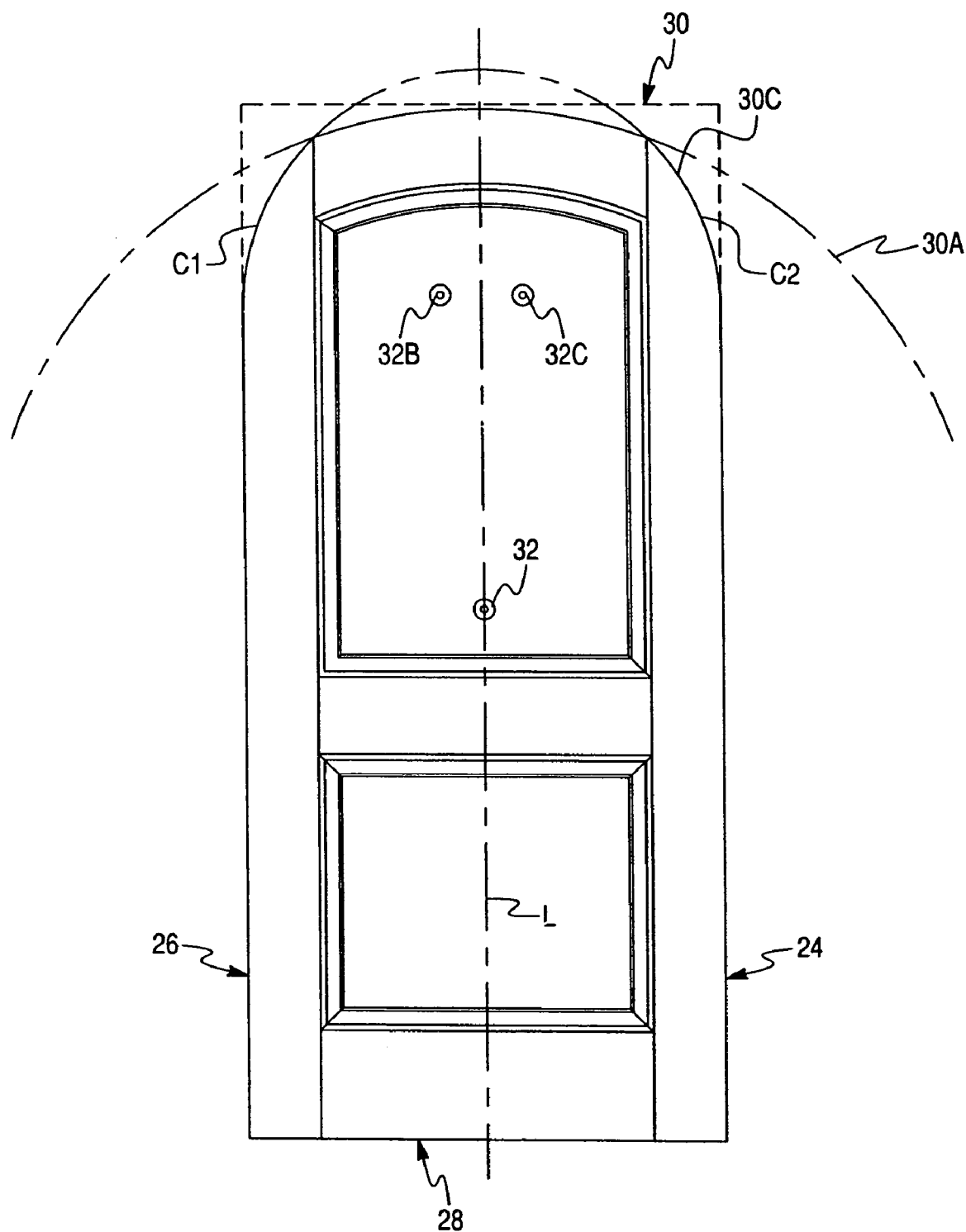
FIG. 8 is a plan view of an arched top panel having an elliptical top edge according to the present invention, with edges of removed portions, a center line and cut lines shown in phantom.

As best shown in FIG. 8, a substantially elliptical edge 30C may be formed in door facing 18. Boss 32 is provided along center line L, as described above. However, two additional bosses 32B, 32C are also provided, which are spaced from center line L. Preferably, bosses 32B, 32C are equally spaced from center line L and from end 30. In order to form elliptical edge 30C, locator pin 16 is first aligned with boss 32. Cutting blade 52 passes through arcuate path A, engaging panel and thereby forming arcuate top edge 30A. Locator pin 16 is then aligned with boss 32B. Router arm 48 is shortened so that cutting blade 52 contacts door facing 18 so that a corner C1 is removed. Locator pin 16 is then aligned with boss 32C so that cutting blade 52 contacts door facing 18 to remove corner C2. Substantially elliptical edge 30C is thereby formed.

The resulting arched top door facing 18 is relatively inexpensive to manufacture because no dedicated molding dies are required. In addition, the cutting operation is relatively easy because locator pin 16 and boss 32 ensure that door facing 18 is properly aligned on receiving surface 14, even if the edges 24, 26 of door facing 18 are uneven. Door facing 18 is aligned on receiving surface 14 using locator pin 16 and bore 36. Cutting blade 52 engages door facing 18 as router arm 50 is rotated about arm support 48. By providing more than one boss 32 on first major surface 20 of door facing 18, a rectangular panel may be formed to have an arched top edge with a selected curvature severity. Thus, a door manufacturer may store a plurality of conventional rectangular facings. Upon receiving an order for an arched top facing (or door) having a particular curvature, the manufacturer simply cuts the conventional rectangular facing(s) according to customer specifications. Thus, the manufacturer need not manufacture and/or warehouse facings having various arch top designs. Furthermore, door facing 18 may also be used for a rectangular door given boss 32 is disposed on first major surface 20, which is intended to be interiorly disposed and thus not visible on a finished door having facings 18.

Figure 9:
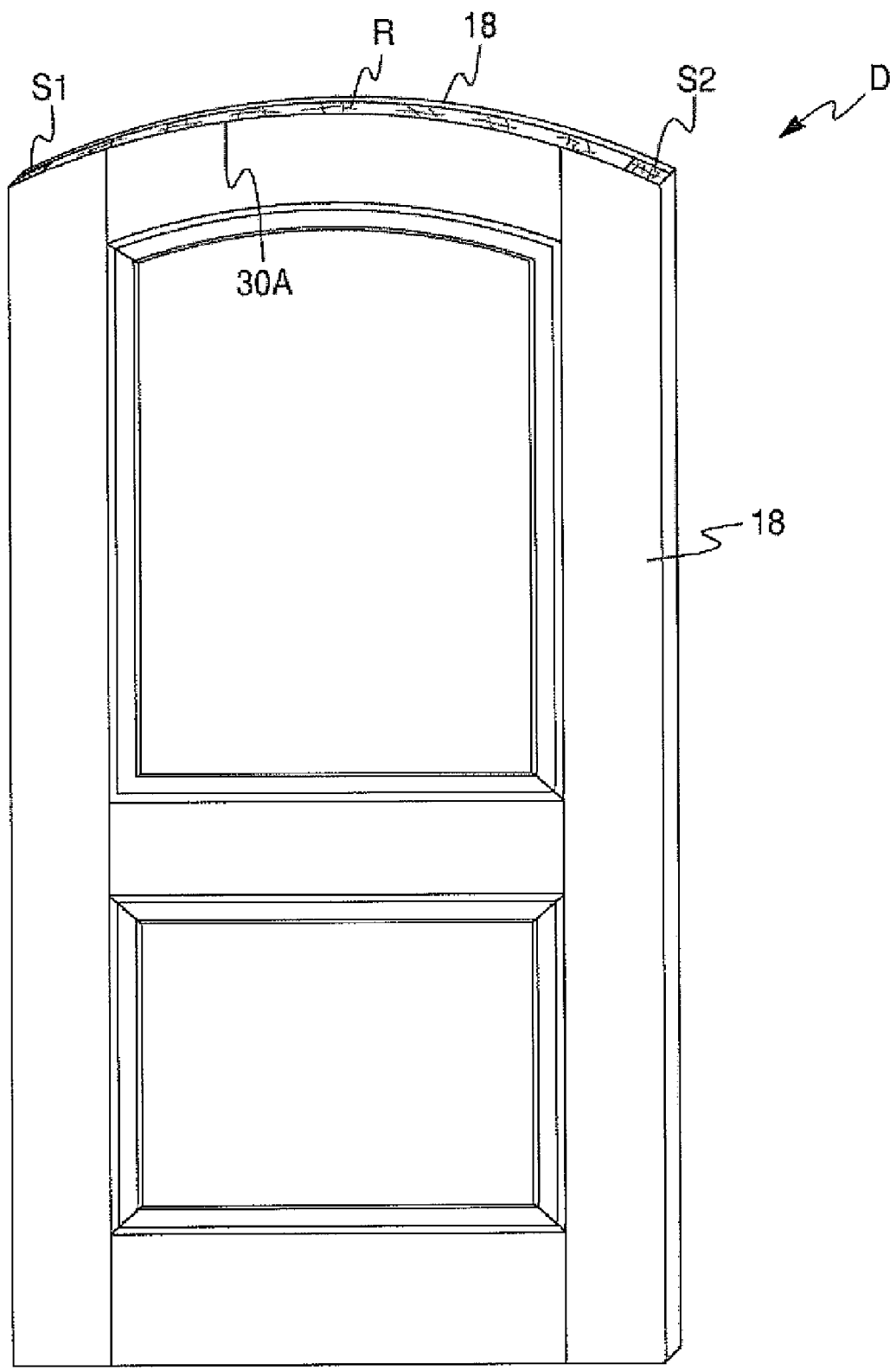
FIG. 9 is a perspective view of a door according to the present invention.

The present invention is also directed to an arched top door D, as best shown in FIG. 9. Door D includes a perimeter frame having first and second stiles S1, S2, a bottom rail (not shown), and an arcuate top rail R. First and second door facings 18 having an arched top edge 30A (or 30B or 30C) are secured to opposite sides of the frame. Arcuate top rail R has the same curvature as the curved top edges of facings 18 so that top edges are aligned therewith.

Certain aspects of the present invention have been explained according to preferred embodiments. However, it will be apparent to one of ordinary skill in the art that various modifications and variations can be made in construction or configuration of the present invention without departing from the scope or spirit of the invention. For example, a stationary cutter assembly may be provided which maintains the blade at a fixed position. A table having a rotatable receiving surface may be provided, so that door facing 18 is aligned with a locator pin on the rotatable receiving surface, and rotated through an arcuate path that engages the stationary blade, thereby cutting the desired arched top edge in the panel. Furthermore, a locator pin may be formed in the panel, which cooperates with a boss provided on the cutting table. It is therefore intended that the present invention cover all such modifications and variations, provided they come within the scope of the following claims and their equivalents.

We claim:

1. A system for forming an arched-top door facing, comprising:

a panel comprising a panel body having a first surface intended to be interiorly disposed and a second surface intended to be exteriorly disposed, and at least one boss integrally molded with said panel body so that said panel body and said boss collectively constitute a monolithic structure;

a table having a planar surface and comprising a locator extending outwardly from said planar surface for cooperating with said boss to locate said panel on said planar surface of said table; and a cutter assembly operatively associated with said table, said cutter assembly comprising a blade spaced from said locator and extending through a plane coplanar with said panel when said panel is located on said planar surface, said blade engaging said panel and forming a curved edge in said panel when one of said blade and said panel is rotated about said locator.

2. The system of claim 1, wherein said locator comprises a cylindrical pin.

3. The system of claim 2, wherein said boss includes a body portion defining a bore sized to receive said cylindrical pin.

4. The system of claim 3, wherein said body portion is donut-shaped.

5. The system of claim 1, wherein said panel is formed from one of thermosetting polymer material, sheet molding compound, and wood composite.

6. The system of claim 1, wherein said cutter assembly includes a high speed router.

7. The system of claim 6, wherein said cutter assembly includes an arm support and a router arm, said router arm having a first end rotatably connected to said arm support and a second end connected to said high speed router.

8. The system of claim 1, wherein said blade rotates about said locator pin along an arcuate path subtending at least about 90°.

9. The system of claim 1, further comprising a holding device disposed above said planar surface and movable toward and away from said planar surface for securing said panel against said planar surface when said panel is located on said planar surface.

10. The system of claim 9, wherein said holding device is axially aligned with said locator.

11. The system of claim 1, wherein said table includes at least one side wall extending upwardly from a perimeter edge of said planar surface for aligning an edge of said panel.

12. An arched-top door facing, comprising:
a panel body comprising first and second major surfaces, said first major surface intended to be interiorly disposed and said second major surface intended to be exteriorly disposed, said first and second major surfaces defined by a first side edge, a second side edge substantially parallel to said first side edge, a bottom edge, and an arcuate top edge; and at least one boss extending from and disposed on said first major surface, said boss having a donut-shaped body portion defining a bore, said boss being integrally molded with said panel body so that said panel body and said boss collectively constitute a monolithic structure.

13. The arched top door facing of claim 12, wherein said panel body is formed from one of thermosetting polymer material, sheet molding compound, and wood composite.

14. An arched-top door, comprising:
a perimeter frame comprising first and second stiles, a bottom rail, and an arcuate top rail; and first and second door facings having interiorly disposed surfaces respectively secured to opposite sides of said frame and exteriorly disposed surfaces facing away from said frame, each of said surfaces defined by first and second side edges, a bottom edge, and an arcuate top edge aligned with and secured to said first and second stiles, bottom rail and arcuate top rail, respectively, each of said facings comprising a panel body and at least one donut-shaped boss extending from and disposed on said interiorly disposed surface, said panel body and said donut-shaped boss being integrally molded with one another so that said panel body and said donut-shaped boss collectively constitute a monolithic structure.

15. The arched top door of claim 14, wherein each of said facings are formed from one of thermosetting polymer material, sheet molding compound, and wood composite.

16. A method of forming an arched-top door facing, comprising:
providing a panel comprising a panel body having opposite first and second major surfaces, and at least one boss extending from the first major surface, the boss having a body portion defining a bore and being integrally molded with said panel body so that said panel body and said boss collectively constitute a monolithic structure;

providing a table having a planar surface and a locator pin extending outwardly from the planar surface;

providing a cutter assembly operatively associated with the table, the cutter assembly having a blade spaced by a first distance from the locator pin;

aligning the pin with the bore and inserting the pin therein so that the first major surface is disposed on the table planar surface; and rotating one of the panel and the blade about the locator pin so that the blade engages the panel and forms an arcuate edge in the panel.

17. The method of claim 16, wherein:
the at least one boss comprises at least first and second spaced bosses extending from the first major surface;

said aligning comprises selecting the bore from the first boss;

said rotating one of the panel and the blade about the selected bore causes the blade to travel along a first arcuate path and forms an arcuate edge in the panel.

18. The method of claim 17, further comprising:
adjusting the blade of the cutting assembly so that the blade is spaced by a second distance from the locator pin, the second distance greater than the first distance;

selecting the bore from the second boss;

aligning the pin with the bore of the selected second boss and inserting the pin therein;

rotating one of the panel and the adjusted blade about the bore of the selected second boss so that the blade travels along a second arcuate path and engages portions of the formed arcuate edge of the panel, the first and second arcuate paths collectively establishing a substantially elliptical shape at the edge of the panel.

* * * * *